8344X
J. WOODEL.
Oliver.
Patented Aug. 6, 1834.
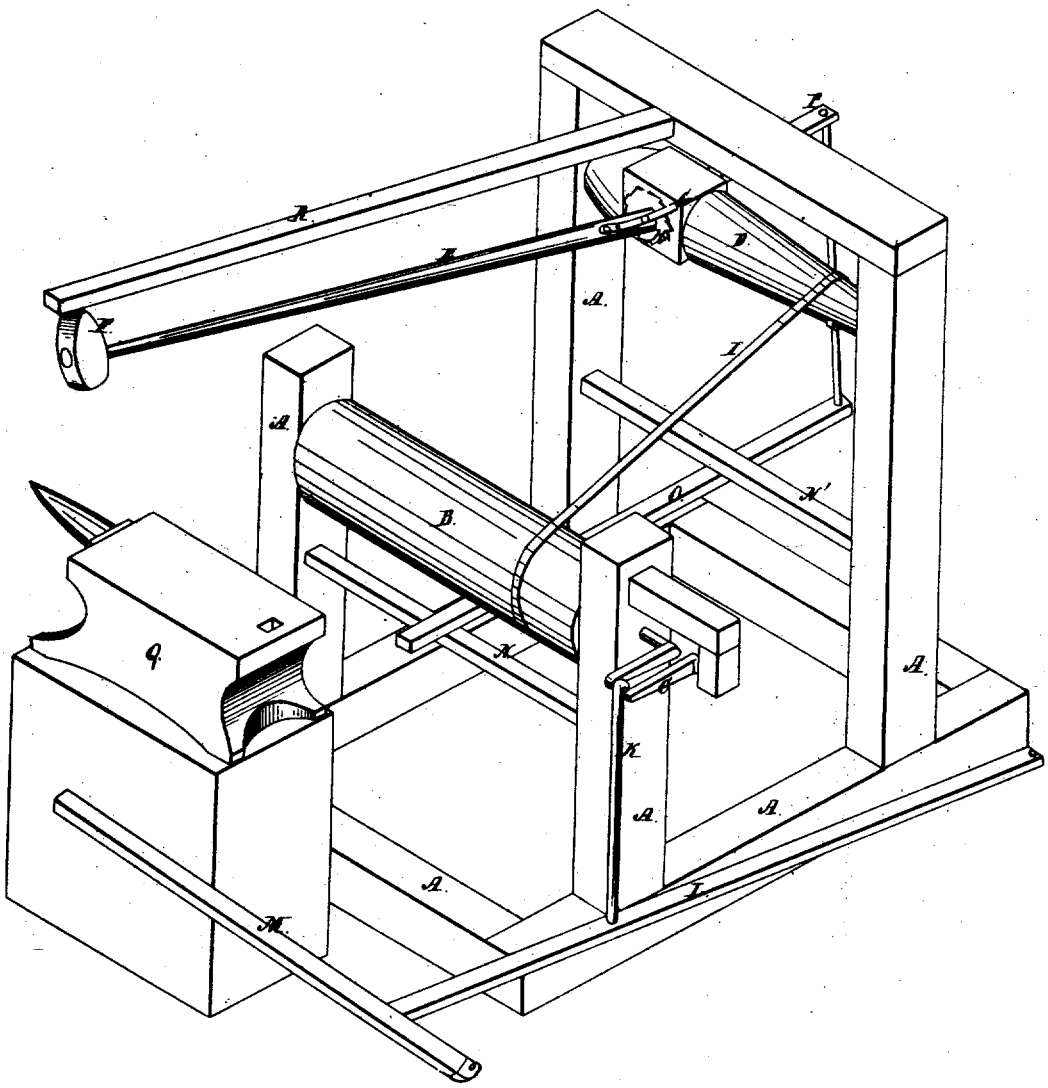
THE NORRIS PETERS CO., PHOTO-LITHO., WASHINGTON, D. C.

Aug. 6. 1834 ar 14

Joel Woodel. Jackson Tennessee.

8344X

Letters Patent August 6. 1834.

The Schedule refered to in these Letters Patent and making part of the same containing a description in the words of the said Joel Woodel him self of his improvement in hammering iron by a machine constructed to supply the place of a common hand as a Striker To all to whom these presents shall come. Know Ye that I Joel Woodel of Jackson in the County of Madison and State of Tennessee Blacksmith have invented and constructed a new and useful improvement in the art of hammering iron on the anvil by a machine to supply the place of a striker with a common sledge hammer called by the inventor the improved Blacksmiths striker. and the following is a full and perfect description of the plan construction and operation of said machine 1st A ground frame composed of four sills tenanted and morticed to connect them in nearly a square the longest or side sills about three feet and an half in length. the shortest or cross sills about two feet six inches, all of them from six to nine inches square so as to give strength and weight 2nd Four upright posts tenanted into the sills flush with the outside but so far from the ends as to occupy a station about one foot six inches apart the projecting ends of the sills will keep the frame steady. The post and the ends next the anvil about 3 inches square and 2 feet 6 inches high The remote or two back posts about the same size but 3 feet four inches in height. braces and caps can be placed on the hindmost uprights braces also to those in front. these braces can be placed according to the fancy of the builder. 3d A cylinder about 4 inches diameter to occupy a horizontal position between the upright posts next the anvil the right hand end of which is supported by a gudgeon passing through the post and turned into a crank which returns in its bend to the line of the gudgeon where it forms another point or gudgeon supported by a frame set on the upright post. the length of the crank from its centre is about six inches. The other end of the cylinder is
supported by a gudgeon in the left hand post. 4th another cylinder
resting on gudgeons also placed horizontally but between the back up
right posts. This cylinder is about 5 or 6 inches diameter swelled
at the part of it where the hammer helve passes through it.
5th A Sledge Hammer on a helve about four feet long set into the
last described cylinder near the left hand end of it. This helve is
made to move ~~round~~ upon a journal so as to move the pean or
face of the hammer to the anvil a small iron lever set into the helve
at the cylinder moves it round and by notches in the metallic
plate placed on the cylinder holds the hammer to its position a small
spring holds the lever in the notch it is wanted to occupy
6th A chain connected to the last mentioned cylinder at the under side
by a staple is thence brought up over it and carried forward to the next
or front cylinder over it also and by a hook fastened at the bottom
or under side. by the hook the chain can be tightened so as to keep
the working power connect and prevent sliding
7th a rod or chain connecting with the crank and extending down to
near the ground is fastened to a lever this lever is of wood and is placed
parallel with the longest sills it is about five feet long fastened by
a pivot at the end remote from the anvil the other end to move up
and down as a support of a treadle which crosses at right angles
passing in front of the anvil block has the left hand end of it in a posi-
tion to receive the foot of the smith the right hand end is fastened
by a pivot like the lever — 8th 4 Springs 2 crossing between the
upright posts the ends let into them one of each is placed under each
cylinder. the third is a transverse spring the end next the anvil block
rest upon the spring between the front posts passes under the spring
between back posts and its remote end is connected by a short chain
to the last spring which is set into the cylinder which holds the ham-
mer The springs are adjusted so as to keep the hammer at the
elevation from which the stroke is directed. a spiral spring of
metal may be used instead of the three first springs by fastening ~~by fastening~~ its lower end to foot of the frame and the upper end
to the end of the spring which is set into the hammer cylinder if
the four springs are used all of them may be of wood or metal tho' wood
is esteemed the best and cheapest much depends upon the springs
their strength and proper adjustment even the lever and treadle piece
above described should in some degree be flexible
9th A spring or small rabbit is placed over the hammer helve &
is set into the cross or cap bar on the back posts. this rabbit keeps
the hammer from being thrown too high. The motion in the whole is
given by the treadle which operating upon the lever the rod crank cyl-
inder by means of the connecting chain brings down the Hammer
with a force governed by the motion of the foot. the spring hoisting
the hammer. The whole forming a very striking Blacksmiths aid.

In testimony that the foregoing are my specifications of
my invention as above set forth Illustrated and described I have
hereunto set my hand this day of May 1834.

Witnesses
Stephen Eggert
R C Hodge.

Joel Woodel

Drawing

E'd
C.J.W.

1106 n.o.